(12) United States Patent
Kinstler

(10) Patent No.: US 7,685,442 B2
(45) Date of Patent: Mar. 23, 2010

(54) METHOD AND SYSTEMS FOR A RADIATION TOLERANT BUS INTERFACE CIRCUIT

(75) Inventor: Gary A. Kinstler, Torrance, CA (US)

(73) Assignee: The Boeing Company, Chicago, IL (US)

( * ) Notice: Subject to any disclaimer, the term of this patent is extended or adjusted under 35 U.S.C. 154(b) by 313 days.

(21) Appl. No.: 11/740,386

(22) Filed: Apr. 26, 2007

(65) Prior Publication Data

US 2007/0288773 A1    Dec. 13, 2007

Related U.S. Application Data

(63) Continuation of application No. 10/813,152, filed on Mar. 30, 2004, now Pat. No. 7,228,442.

(51) Int. Cl.
*G06F 1/00* (2006.01)
*G06F 11/30* (2006.01)
*G06F 15/16* (2006.01)

(52) U.S. Cl. .................. 713/300; 713/330; 713/340; 709/250

(58) Field of Classification Search .......... 713/300, 713/330, 340; 709/250
See application file for complete search history.

(56) References Cited

U.S. PATENT DOCUMENTS

| | | | |
|---|---|---|---|
| 4,013,938 A | 3/1977 | McCoy | |
| 4,794,595 A | 12/1988 | Ohyama | |
| 5,170,473 A | 12/1992 | Ishida | |
| 5,485,576 A | 1/1996 | Fee et al. | |
| 5,548,467 A | 8/1996 | Heaney et al. | |
| 5,941,997 A * | 8/1999 | Greaves | 714/48 |
| 6,064,554 A | 5/2000 | Kim | |
| 6,067,628 A | 5/2000 | Krithivas et al. | |
| 6,466,539 B1 | 10/2002 | Kramer et al. | |
| 6,483,317 B1 | 11/2002 | Floro et al. | |
| 6,516,418 B1 | 2/2003 | Lee | |
| 6,717,913 B1 | 4/2004 | Ghahremani et al. | |
| 6,807,148 B1 | 10/2004 | Eicher | |
| 6,937,454 B2 | 8/2005 | Mikolajczak et al. | |
| 6,963,985 B2 | 11/2005 | Stachura et al. | |

(Continued)

OTHER PUBLICATIONS

Tai et al., "COTS-Based Fault Tolerance in Deep Space: Qualitative and Quantitative Analyses of a Bus Network Architecture", 4th IEEE Intl. Symposium on High Assurance Systems Engineering, Nov. 1999, pp. 1-8.

*Primary Examiner*—Ji H Bae
(74) *Attorney, Agent, or Firm*—Caven & Aghevli LLC

(57) ABSTRACT

A bus management tool that allows communication to be maintained between a group of nodes operatively connected on two busses in the presence of radiation by transmitting periodically a first message from one to another of the nodes on one of the busses, determining whether the first message was received by the other of the nodes on the first bus, and when it is determined that the first message was not received by the other of the nodes, transmitting a recovery command to the other of the nodes on a second of the of busses. Methods, systems, and articles of manufacture consistent with the present invention also provide for a bus recovery tool on the other node that re-initializes a bus interface circuit operatively connecting the other node to the first bus in response to the recovery command.

23 Claims, 11 Drawing Sheets

U.S. PATENT DOCUMENTS

| | | |
|---|---|---|
| 6,973,093 B1 | 12/2005 | Briddell et al. |
| 7,193,985 B1 | 3/2007 | Lewis et al. |
| 7,269,133 B2 | 9/2007 | Lu et al. |
| 2004/0213174 A1 | 10/2004 | Engels et al. |
| 2004/0229478 A1 | 11/2004 | Chen |
| 2005/0013319 A1 | 1/2005 | Kenkare |
| 2005/0025088 A1 | 2/2005 | Choi |
| 2005/0030926 A1 | 2/2005 | Qian et al. |
| 2005/0060587 A1 | 3/2005 | Hwang et al. |
| 2005/0162882 A1 | 7/2005 | Reeves et al. |
| 2006/0002314 A1 | 1/2006 | Fukunaga et al. |

* cited by examiner

FIG. 3

300 {
| Bit No. | |
|---|---|
| 1 | 1 = Power Down Command, Channel A Link |
| 2 | 1 = Power Down Command, Channel A PHY |
| 3 | 1 = Power Down Command, Channel B Link |
| 4 | 1 = Power Down Command, Channel B PHY |
| 5 | 1 = Activate Current Surge Test for the Enabled Outgoing UART Source |
| 6 | 0 = Enable Channel A for Outgoing UART Data, 1 = Enable Channel B |
| 7 | 0 = Enable Monitoring of Link Current for Outgoing UART Data, 1 = Enable PHY Current Monitoring |
| 8 | Reserved - Set to 0 in Control Latch |

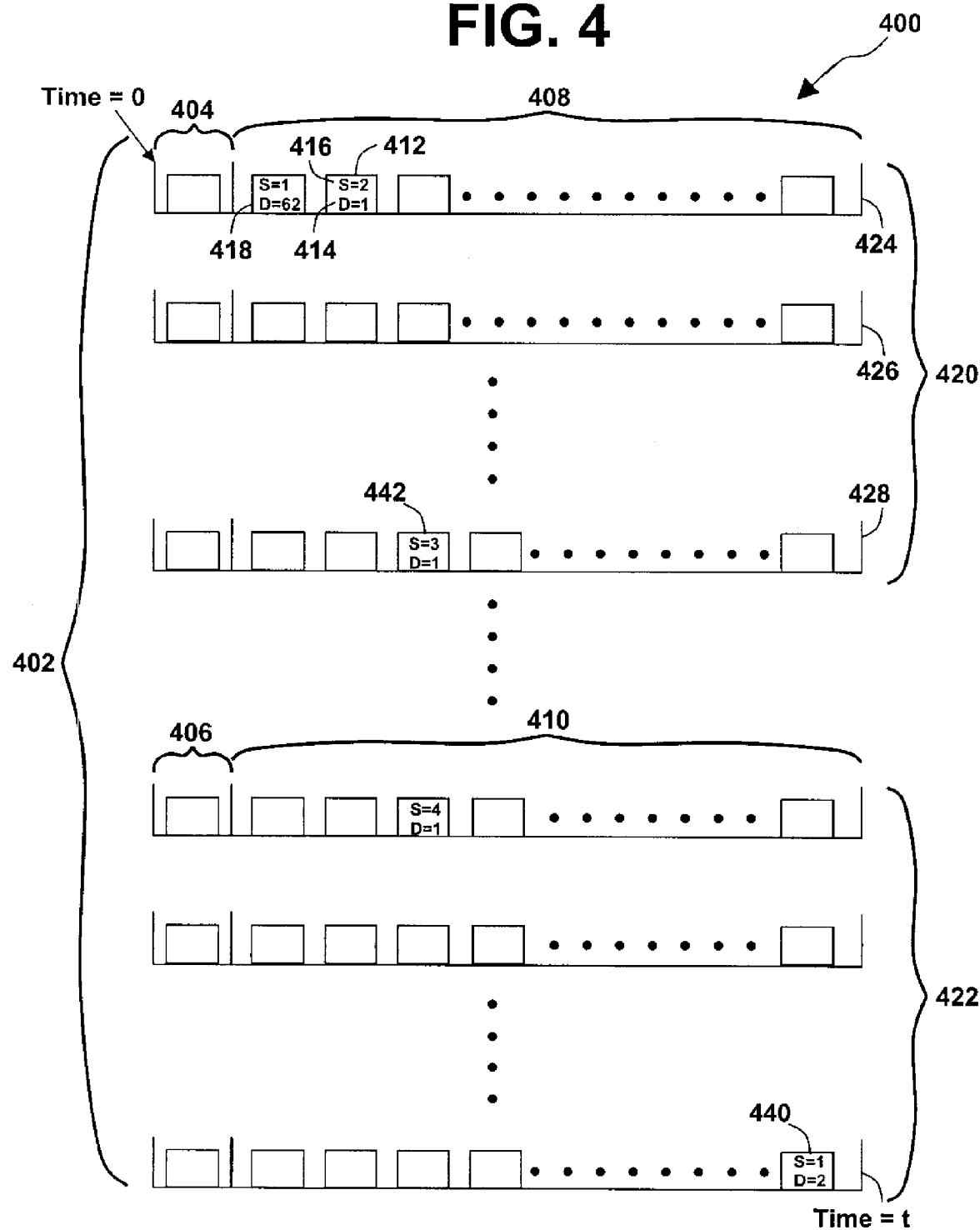

METHOD AND SYSTEMS FOR A RADIATION TOLERANT BUS INTERFACE CIRCUIT

This application is a continuation of U.S. patent application Ser. No. 10/813,152 entitled "Method and Systems for a Radiation Tolerant Bus Interface Circuit", filed on Mar. 30, 2004. U.S. patent application Ser. No. 10/813,152 is hereby incorporated by reference. This application also relies upon and incorporates by reference U.S. patent application Ser. No. 10/813,296, entitled "Methods and Systems for a Data Processing System Having Radiation Tolerant Bus," and filed on Mar. 30, 2004;

The invention described herein was made in the performance of work under NASA Contract No. NAS8-01099 and is subject to the provisions of Section 305 of the National Aeronautics and Space Act of 1958 (72 Stat. 435: 42 U.S.C. 2457)

BACKGROUND OF THE INVENTION

The present invention relates to communication networks, and, more particularly, to systems and methods for recovery of communication to a node on a high speed serial bus.

High speed serial bus networks are utilized in automotive, aircraft, and space vehicles to allow audio, video, and data communication between various electronic components or nodes within the vehicle. Vehicle nodes may include a central computer node, a radar node, a navigation system node, a display node, or other electronic components for operating the vehicle.

Automotive, aircraft, and space vehicle manufacturers often use commercial off-the-shelf (COTS) parts to implement a high speed serial bus to minimize the cost for developing and supporting the vehicle nodes and the serial bus network. However, COTS for implementing a conventional high speed serial bus network in a home to connect a personal computer to consumer audio/video appliances (e.g., digital video cameras, scanners, and printers) is susceptible to errors induced by radiation, which may be present in space (e.g., proton and heavy ion radiation) or come from another vehicle having a radar device (e.g., RF radiation). Conventional methods of shielding high speed serial bus networks and COTS parts from radiation do not adequately protect against proton and heavy ion radiation radiation. In addition, conventional shielding may be damaged (e.g., during repair of a vehicle), permitting a radiation induced latch-up error or upset error to occur. A COTS part experiencing a radiation induced latch-up error typically does not operate properly on the associated high speed bus network. A COTS part experiencing a radiation induced upset error typically communicates erroneous data to the associated node or on the high speed bus network. Thus, vehicles that use COTS to implement a conventional high speed serial bus network are often susceptible to radiation induced errors that may interrupt communication between vehicle nodes, creating potential vehicle performance problems.

For example, a conventional high-speed serial bus following the standard IEEE-1394 ("IEEE-1394 bus") allows a personal computer to be connected to consumer electronics audio/video appliances, storage peripherals, and portable consumer devices for high speed multi-media communication. However, when a conventional IEEE-1394 bus is implemented in a vehicle using COTS parts, radiation from another vehicle's radar or radiation present in space may cause a latch-up or upset error on the conventional IEEE-1394 bus that often renders one or more of the vehicle's nodes inoperative.

Some conventional vehicles employ a second or redundant high-speed serial bus to allow communication between vehicle nodes to be switched to the redundant bus when a "hard fail" (e.g., vehicle node ceases to communicate on the first bus) occurs on the first bus. Radiation induced latch-up errors often cause "hard fails" when COTS parts are used in the vehicle nodes to implement the first and redundant busses. For example, the U.S. Advanced Tactical Fighter (ATF) aircraft has a redundant IEEE-1394 high-speed serial bus network. But the ATF and other conventional vehicles employing a redundant high-speed serial bus implemented using COTS components are still typically susceptible to radiation latch-up or upset errors and do allow for recovery of the primary bus when a "hard fail" occurs on that bus.

Therefore, a need exists for systems and methods that overcome the problems noted above and others previously experienced for error recovery on a high speed serial bus.

SUMMARY OF THE INVENTION

In accordance with methods consistent with the present invention, a method in a data processing system is provided. The data processing system has a plurality of nodes operatively connected to a network having a plurality of busses and one of the nodes has a bus management tool. The method comprises: transmitting periodically a first message from one of the plurality of nodes to another of the nodes on a first of the plurality of busses of the network, determining whether the first message was received by the other of the nodes on the first bus, and when it is determined that the first message was not received by the other of the nodes, transmitting a recovery command to the other of the nodes on a second of the plurality of busses.

In accordance with articles of manufacture consistent with the present invention, a computer-readable medium containing instructions causing a program in a data processing system to perform a method is provided. The data processing system has a plurality of nodes operatively connected to a network having a plurality of busses. The method comprises: transmitting periodically a first message from one of the plurality of nodes to another of the nodes on a first of the plurality of busses of the network, determining whether the first message was received by the other of the nodes on the first bus, and when it is determined that the first message was not received by the other of the nodes, transmitting a recovery command associated with the first bus to the other of the nodes on a second of the plurality of busses.

In accordance with systems consistent with the present invention, a data processing apparatus is provided. The data processing apparatus comprises: a plurality of network interface cards operatively configured to connect to a network having a plurality of busses, each network interface card having a bus interface circuit operatively configured to connect to a respective one of the plurality of busses; a memory having a program that transmits periodically a first message to at least one of a plurality of nodes operatively connected to a first of the plurality of busses of the network, determines whether the first message was received by the other of the nodes on the first bus, and transmits a recovery command associated with the first bus to the other of the nodes on a second of the plurality of busses in response to determining that the first message was not received by the other of the nodes; and a processing unit for running the program.

In accordance with systems consistent with the present invention, a network interface apparatus is provided. The network interface apparatus comprises: a bus interface circuit for operatively connecting the network interface card to a bus;

a power controller operatively connected to the bus interface circuit; a current sensor operatively connected to the bus interface circuit to sense a current level in the bus interface circuit; and means for determining whether the sensed current level exceeds a predetermined level and for causing the power controller to cycle power to the bus interface circuit in response to determining that the sensed current level exceeds the predetermined level.

In accordance with methods consistent with the present invention, a method in a data processing system is provided. The data processing system includes a network having a bus. The method comprises: sensing a current level in a bus interface circuit operatively connecting a node on the network to the bus; determining whether the sensed current level exceeds a predetermined level; and re-initializing the bus interface circuit in response to determining that sensed current level exceeds the predetermined level.

In accordance with articles of manufacture consistent with the present invention, a computer-readable medium containing instructions causing a program in a data processing system to perform a method is provided. The data processing system includes a network having a bus. The method comprises: sensing a current level in a bus interface circuit operatively connecting a node on the network to the bus; determining whether the sensed current level exceeds a predetermined level; and re-initializing the bus interface circuit in response to determining that sensed current level exceeds the predetermined level.

Other systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings:

FIG. 3 depicts an exemplary control message that may be sent from the bus recovery tool of FIG. 1 to a bus interface recovery circuit of a node to control the operation of the bus interface recovery circuit;

FIG. 4 depicts an exemplary timing diagram for a frame of messages generated by nodes in the data processing system of FIG. 1;

DETAILED DESCRIPTION OF THE INVENTION

Reference will now be made in detail to an implementation in accordance with methods, systems, and products consistent with the present invention as illustrated in the accompanying drawings. The same reference numbers may be used throughout the drawings and the following description to refer to the same or like parts.

Figure 1:
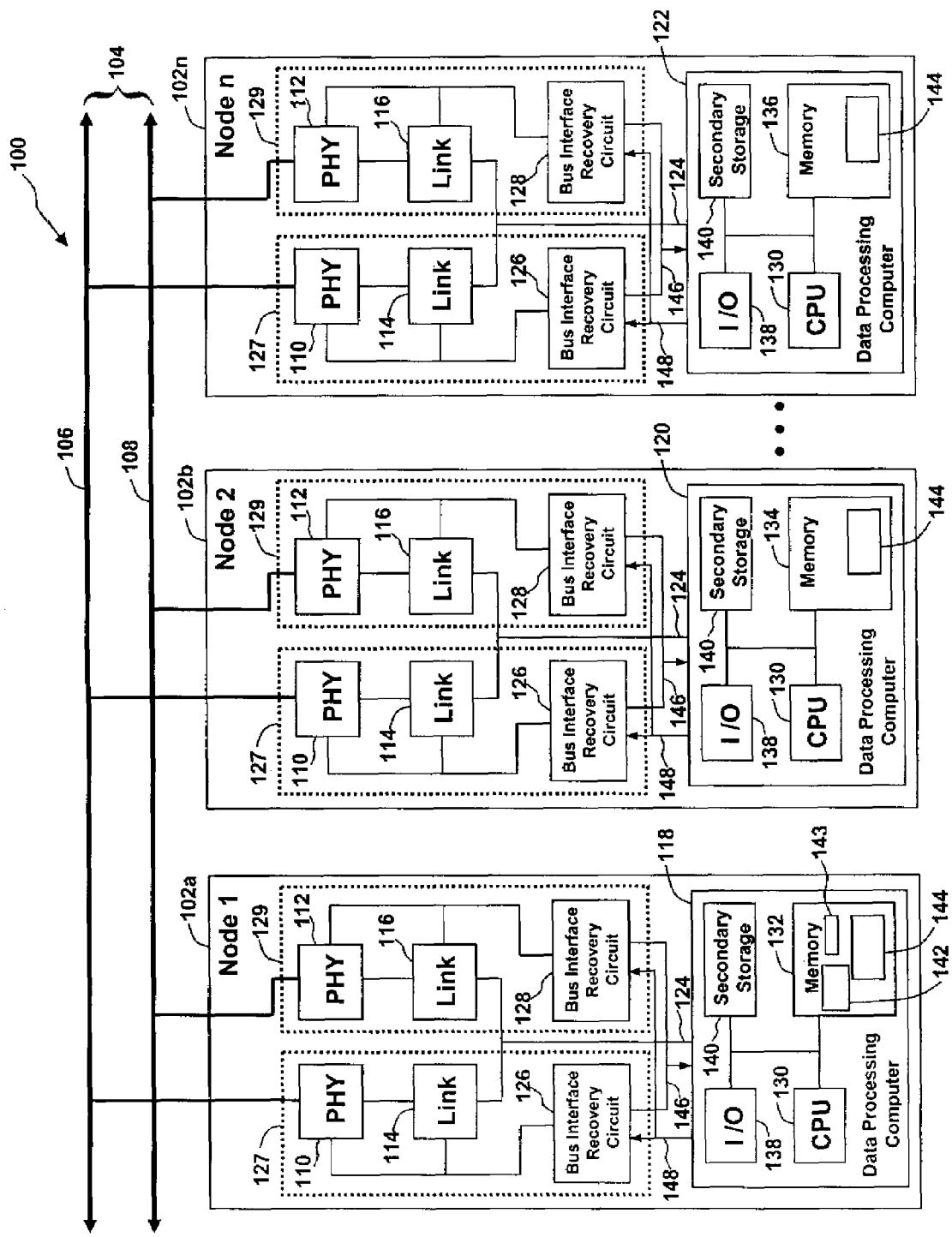
FIG. 1 depicts a block diagram of a vehicle data processing system having a bus management tool and a bus recovery tool suitable for practicing methods and implementing systems consistent with the present invention.

FIG. 1 depicts a block diagram of a data processing system 100 implemented in a vehicle, such as an automotive, aircraft or space vehicle, and suitable for practicing methods and implementing systems consistent with the present invention. The data processing system 100 includes a plurality of nodes 102a-102n operatively connected to a network 104 having a primary bus 106 and a secondary bus 108. In one implementation, each node 102a corresponds to a separate electronic component within the vehicle. As explained in detail below, one of the nodes 102a is a data processing apparatus operatively configured to manage communication between the nodes 102a-102n and to detect and recover from a radiation-induced bus error, such as a node experiencing a latch-up or radiation induced upset condition, on the network 104.

Each node 102a-102n has at least two bus interface circuits (e.g., circuits 110 and 112) to operatively connect the respective node 102a-102n to both the primary bus 106 and the secondary bus 108. In the implementation shown in FIG. 1, each node 102a-102n has a physical layer (PHY) controller 110 operatively connected to the primary bus 106 and a PHY controller 112 operatively connected to the secondary bus 108. Furthermore, each node 102a-102n has a link layer (LINK) controller 114 or 116 operatively connected to a respective PHY controller 110 or 112. The PHY controller and the LINK controller for each bus (e.g., circuits 110, 114 for the primary bus and circuits 112, 116 for the secondary bus) may be incorporated into a single bus interface circuit (not shown in figures). The PHY controllers 110 and 112 and the LINK controllers 114 and 116 are configured to support known protocols for open system architecture or interconnection of applications performed on or by the respective nodes 102a-102n. The protocols may follow the established Open Systems Interconnect (OSI) seven-layer model for a communication network defined by the International Standards Organization (ISO) to allow heterogeneous products (e.g., vehicle nodes) to exchange data over a network (e.g., network 104).

In particular, each PHY controller 110 and 112 may be operatively configured to send and receive data packets or messages on the respective bus 106 and 108 of the network 104 in accordance with the bus 106 and 108 communication protocol (e.g., IEEE-1394b cable based network protocol) and bus 106 and 108 physical characteristics, such as fiber optic or copper wire. Each PHY controller 110 and 112 may also be configured to monitor the condition of the bus 106 and 108 as needed for determining connection status and for initialization and arbitration of communication on the respective bus 106 and 108. Each PHY controller 110 and 112 may be any COTS PHY controller, such as a Texas Instrument 1394b Three-Port Cable Transceiver/Arbiter (TSB81BA3) configured to support known IEEE-1394b standards.

Each LINK controller 114 and 116 is operatively configured to encode and decode into meaningful data packets or messages and handle frame synchronization for the respective node 102a-102n. Each LINK controller 114 and 116 may be any COTS LINK controller, such as a Texas Instrument 1394b OHCI-Lynx Controller (TSB82AA2) configured to support known IEEE-1394b standards.

Each node 102a-102n also has a data processing computer 118, 120, and 122 operatively connected to the two bus interface circuits (e.g., circuits 110, 112, or circuits 110, 114 and 112, 116) via a second network 124. The second network 124 may be any known high speed network or backplane capable of supporting audio and video communication as well as asynchronous data communication within the node 102a-102n, such as a compact peripheral component interconnect (cPCI) backplane, local area network ("LAN"), WAN, Peer-to-Peer, or the Internet, using standard communications protocols. The secondary network 124 may include hardwired as well as wireless branches.

Each node 102a-102n also has a bus interface recovery circuit 126 and 128 operatively connected between the data processing computer 118, 120, and 122 and a respective bus interface circuit (e.g., circuits 110 and 112, or circuits 110, 114 and 112, 116). In one implementation, one bus interface recovery circuit (e.g., 126) may be operatively connected to both bus interface circuits of the node 102a-102n. In another implementation, the PHY controller 110 or 112, the LINK controller 114 or 116, and the bus interface recovery circuit 126 or 128 may be incorporated into a single network interface card 127 and 129.

As explained in detail below, each bus interface recovery circuit 126 and 128 is configured to sense a radiation induced glitch or current surge (e.g., a short circuit condition) on a respective interface circuit 110, 112, 114, or 116, which may cause the bus interface circuit that is operatively connected to the respective bus to latch-up (such that the bus interface circuit may no longer properly communicate on the bus 106 or 108) or experience a radiation induced upset (such as a single event functional interrupt which may disrupt a control register) where the bus interface circuit may no longer communicate on the bus 106 or 108. Each bus interface recovery circuit 126 and 128 may automatically re-initialize the bus interface circuit or report the radiation induced error to the data processing computer 118, 120, and 122 for further processing.

As shown in FIG. 1, each data processing computer 118, 120, and 122 includes a central processing unit (CPU) 130, a memory 132, 134, and 136, and an I/O device 138. Each I/O device 138 is operatively configured to connect the respective computer 118, 120, and 122 to the second network 124 and to the respective bus interface circuits 126 and 128 of the node 102a-102n. Each data processing computer 118, 120, and 122 may also include a secondary storage device 140 to store data packets or applications accessible by CPU 130 for processing in accordance with methods and systems consistent with the present invention.

Memory in one of the data processing computers (e.g., memory 132 of data processing computer 118) stores a bus management program or tool 142. As described in more detail below, the bus management tool 142 in accordance with systems and methods consistent with the present invention detects a bus interface circuit 110, 112, 114, or 116 of a node 102a-102n that is experiencing a latch-up or radiation induced upset condition on a bus 106 or 108 and causes the corresponding bus interface recovery circuit 126 or 128 to clear the latch-up or radiation induced upset condition so that communication on the bus 106 or 108 via interface circuit 110, 112, 114, or 116 to the node 102a-102n is maintained or re-established. The same memory 132 that stores the bus management tool 142 may also store a recovery command 143. As described herein, the bus management tool 142 may transmit the recovery command 143 in a message on one bus (e.g., either the primary bus 106 or the secondary bus 108 not effected by radiation) to another node 102b-102n to cause the other node to clear the radiation induced latch-up or upset condition associated with its bus interface circuit (e.g., circuits 110, 114, or both) so that the other node can maintain communication on both busses 106 and 108.

Memory 132, 134, and 136 in each of the data processing computers 118, 120, and 122, respectively, stores a bus recovery program or tool 144 used in accordance with systems and methods consistent with the present invention to respond to a recovery command 143 and to allow the bus management tool 142 to communicate with the bus interface recovery circuit 126 and 128 for each node 102a-102n as described herein.

Bus recovery tool 142 is called up by each CPU 130 from memory 132, 134, and 136 as directed by the respective CPU 130 of nodes 102a-102n. Similarly, bus management tool 142 and the recovery command 143 are called up by the CPU 130 of node 102a from memory 132 as directed by the CPU 130 of node 102a. Each CPU 130 operatively connects the tools and other programs to one another using a known operating system to perform operations as described below. In addition, while the tools or programs are described as being implemented as software, the present implementation may be implemented as a combination of hardware and software or hardware alone.

Although aspects of methods, systems, and articles of manufacture consistent with the present invention are depicted as being stored in memory, one having skill in the art will appreciate that these aspects may be stored on or read from other computer-readable media, such as secondary storage devices, including hard disks, floppy disks, and CD-ROM or other forms of ROM or RAM either currently known or later developed. Further, although specific components of data processing system 100 have been described, one skilled in the art will appreciate that a data processing system suitable for use with methods, systems, and articles of manufacture consistent with the present invention may contain additional or different components.

Figure 2:
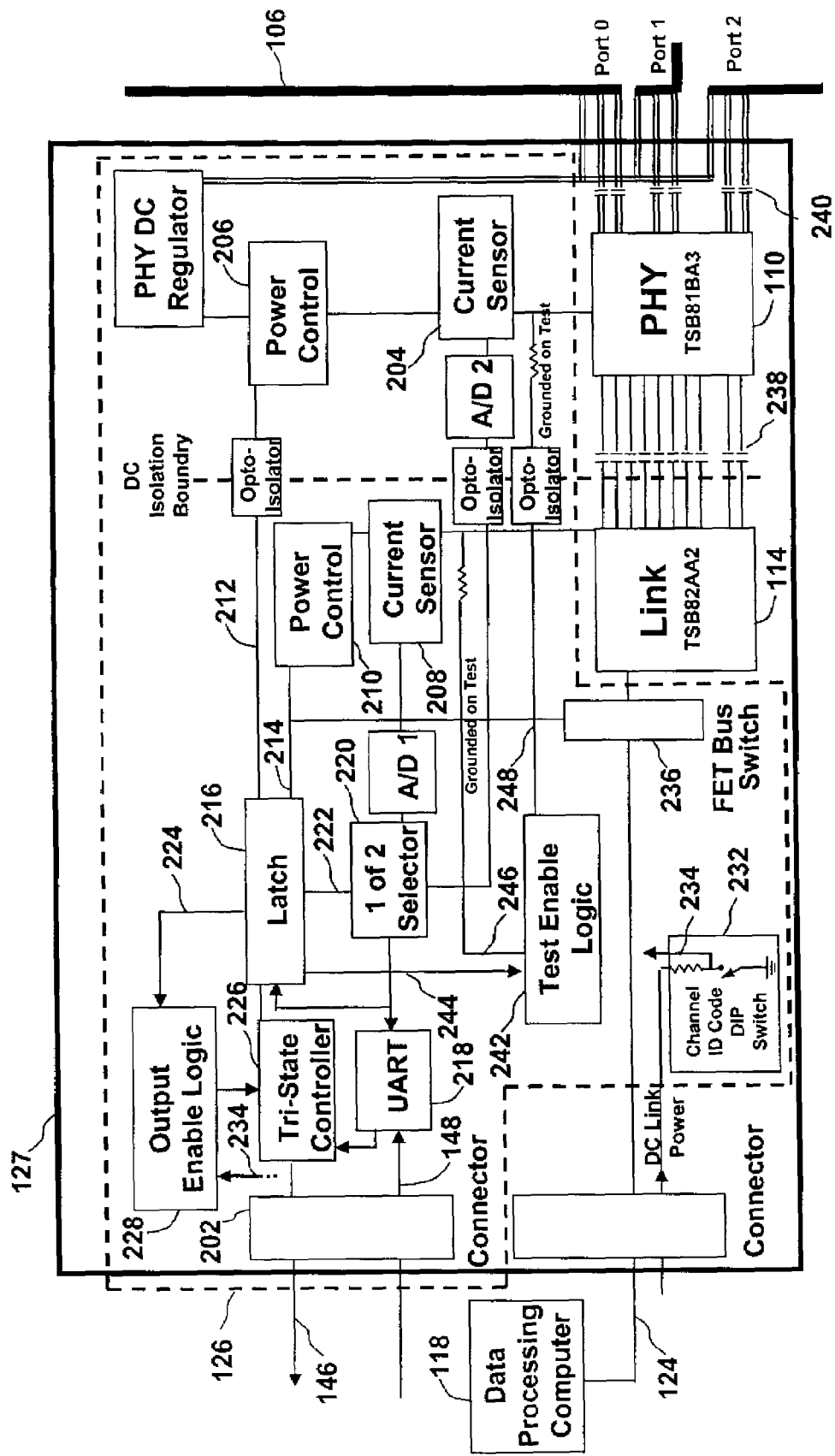
FIG. 2 depicts an exemplary block diagram of a bus interface recovery circuit suitable for use with methods and systems consistent with the present invention.

FIG. 2 depicts an exemplary block diagram of the bus interface recovery circuit 126 for node 102a. The components of bus interface recovery circuits 126 and 128 for each node 102a-102n suitable for implementing the methods and systems consistent with present invention may be the same. Thus, for the sake of brevity, only the components of bus interface recovery circuit 126 depicted in FIG. 2 shall be discussed in detail as one having skill in the art will appreciate.

As shown in FIG. 2, the bus interface recovery circuit 126 includes a terminal 202 for data communication connection to the data processing computer 118 of node 102a, a current sensor 204, and a power controller 206. Both the current sensor 204 and the power controller 206 are operatively connected to the terminal 202 and to at least one interface circuit (e.g., PHY controller 110). The current sensor 204 may be any known current sensing device including a current sensing resistor (e.g., a 0.1 ohm series resistor) or any sensor measuring current based on the magnetoresistive effect.

In the implementation shown in FIG. 2, the bus interface recovery circuit has a second current sensor 208 and a second power controller 210 that are both operatively connected to the terminal 202. Each current sensor 204 and 208 is operatively configured to sense a current level in or to the respective bus interface circuit, PHY controller 110 and Link controller 114, and to report the current level to the data processing computer 118 via the terminal 202. Each power controller 206 and 210 is operatively configured to switch power on or off to the respective bus interface circuit, PHY controller 110 and Link controller 114, in response to a corresponding signal 212 and 214 received from the data processing computer via terminal 202. Each power controller 206 and 210 may source up to 1000 ma.

Thus, bus interface recovery circuits 126 and 128 allow the bus recovery tool 144 of each data processing computer 118, 120, and 122 to sense or monitor the current level on (e.g., current drawn by or through) PHY controller 110 and Link controller 114 of the nodes 102a-102n. In addition, when the sensed current level exceeds a predetermined level (e.g., 200 milliamps corresponding to a radiation-induced glitch or short circuit), the bus interface recovery circuit 126 and 128 allows the bus recovery tool 144 to re-initialize or cycle power to the respective bus interface circuit, PHY controller 110 and Link controller 114. The bus recovery tool may sense a current level, determine that the current level exceeds a predetermined level, and cycle power to the respective bus interface circuit in a period equal to or greater than 10 milliseconds in accordance with methods consistent with the present invention. The period is based on, among other things, power ramp up and down time constraints of the power controllers 206 and 210.

FIG. 3 depicts an exemplary assignment of bits in a control message 300 that may be sent by the bus recovery tool 144 of the data processing computer 118 to the bus interface recovery circuit 126 via terminal 202 for controlling operation of the bus interface recovery circuit. In the implementation shown in FIG. 3, Bits 1 and 2 of control message 300 correspond to respective signals 214 and 212 received by Link controller 114 and PHY controller 110 when the bus interface recovery circuit 126 is configured to connect to channel A or the primary bus 106 of the network 104. Bits 3 and 4 of the control message 300 may correspond to respective signals 214 and 212 received by Link controller 114 and PHY controller 110 when the bus interface recovery circuit 126 is configured to connect to channel B or the secondary bus 108 of the network 104.

Returning to FIG. 2, the bus interface recovery circuit 126 may include a latch 216 operatively connected between the terminal 202 and the power controllers 206 and 210. The latch 216 is adapted to latch or store the bits of the control message 300. The control message 300 may be received either serially or in parallel via terminal 202.

In the implementation shown in FIG. 2, terminal 202 is adapted for serial data communication connection, such as RS-232, RS-485, or I2C, to data processing computer 118 or to the bus management tool 142. In this implementation, the bus interface recovery circuit 126 further comprises a Universal Asynchronous Receiver-Transmitter (UART) 218. The UART 218 is operatively connected between the terminal 202 and the latch 216 such that bits in the control message 300 in FIG. 3 are received serially by the UART from the data processing computer 118 via an input serial bus 148 and then separately latched or stored in the latch 216.

In an alternative implementation, a multi-drop bus, such as an I2C bus, creates the second bus that is used to connect the bus management tool 142 in node 102a to a plurality of or all other nodes 102b-102n.

As shown in FIGS. 1 and 2, each data processing computer 118, 120, and 124 may control respective bus interface recovery circuits 126 and 128 (configured as Channel A and B, or vice versa) via the same input serial bus 148.

The bus interface recovery circuit 126 may also include a switch or multiplexer 220 having an input 222 and operatively connected between the UART 218 and the current sensors 204 and 208. The multiplexer 220 is operatively configured to selectively allow one of the current sensors 204 or 208 to report the respective sensed current level to the data processing computer 118 via UART 218 based on input 222. Input 222 may be operatively connected to latch 216 so that an enable signal transmitted by bus recovery tool 144, such as Bit 7 in control message 300 in FIG. 3, causes multiplexer 220 to select one of the current sensors 204 or 208.

In one implementation, the UART 218 is configured to read latch 216 and report the current control message 300 stored in latch 216 as well as report the sensed current level from the selected current sensor 204 or 208 via an output serial bus 146. As shown in FIGS. 1 and 2, each data processing computer 118, 120, and 124 may receive the sensed current level from respective bus interface recovery circuits 126 and 128 (configured as Channel A and B, or vice versa) via the same output serial bus 146.

The bus recovery tool 144 of the data processing computer 118 may provide a second enable signal 224 (e.g., Bit 6 in FIG. 3 to identify the channel for the network interface card 127) to the bus interface recovery circuit 126 to selectively cause the bus interface recovery circuit 126 to report the sensed current level from the selected current sensor 204 or 208 via terminal 202.

In the implementation shown in FIG. 2, the bus interface recovery circuit 126 also includes a tri-state controller 226 operatively connected between the terminal 202 and the UART 218 and operatively configured to selectively allow either bus interface circuit 126 or 128 to apply its output data on the shared output serial bus 146.

The bus interface recovery circuit 126 may also include an output enable logic 228 circuit and a switch 232 having an output 234 that identifies whether the bus interface recovery circuit 126 is to operate on a "Channel A" (e.g., primary bus 106), or on a "Channel B" (e.g., secondary bus 108) in the data processing system 100. The output enable logic 228 is operatively connected to trigger tri-state controller 226 to allow UART 218 to report the sensed current based upon the output 234 of switch 232 and a state associated with enable signal 224 (e.g., Bit 6 in FIG. 3). For example, the bus recovery tool 144 may transmit the enable 224 signal in an active low state as an indication to enable output of UART 218 if the output 234 of switch 232 reflects "Channel A." The bus recovery tool 144 may then transmit the enable signal 224 in an active high state as an indication to enable output of UART 218 if the output 234 of switch 232 reflects "Channel B."

Returning to FIG. 2, the bus interface recovery circuit 126 may also include a bus switch 236, such as a Texas Instruments switch SN74CBTLV16211, that allows the data processing computer 118, 120, and 122 to isolate the bus interface circuits 110 and 112 when a current surge is detected in one or both of these circuits 110 and 112. In the implementation shown in FIG. 2, the bus switch is operatively connected to the signal 214 used to turn power on or off to the Link controller 114, such that Link controller 114 and PHY controller 110 are isolated from the data processing computer 118, 120, and 122 when power is turned off to the Link controller 114.

In addition, the bus interface recovery circuit 126 or the network interface card 127 may include a first bus isolation device 238 operatively connecting the PHY controller 110 to the Link controller 114 and a second isolation device 240 operatively connecting the PHY controller 110 to the bus 106. The bus isolation devices 238 and 240 may be capacitors in series with data lines corresponding to bus 106. The bus isolation devices 238 and 240 inhibit a current from Link controller 114 or bus 106, which could otherwise maintain a latch-up condition in PHY controller 110.

The bus interface recovery circuit 126 also may include a test enable logic 242 circuit that receives a test enable signal 244 from the bus recovery tool 144 of the respective data processing computer 118, 120, or 122 via latch 216. Test enable logic 242 has a first output 246 operatively connected to the current sensor 208 and a second output 248 operatively connected to the current sensor 204. Test enable logic 242 is operatively configured to send a test signal, such as a ground signal, on the first output 246 and/or the second output 248 to cause the respective current sensor 208 to report a current surge or short circuit in the respective bus interface circuit, Link controller 114 and PHY controller 110. In one implementation, test enable signal 244 may comprise a collection of signals corresponding to Bits 5 and 7 of Command 300 in FIG. 3. In this implementation, test enable logic 242 sends a test signal on the first output 246 to current sensor 208 when Bit 5 is set to enable a current surge test and Bit 7 is set to select receiving the sensed current level of the Link controller 114. Similarly, test enable logic 242 sends a test signal on the second output 246 to current sensor 204 when Bit 5 is set to enable a current surge test and Bit 7 is set to select receiving the sensed current level of the PHY controller 110. Thus, the bus recovery tool 144 of each data processing computer 118, 120, and 122 is able to perform a test on whether each current sensor 204 and 208 as well upstream hardware and software components are operative for identifying a radiation-induced error.

Turning to FIG. 4, an exemplary timing diagram 400 is depicted for a frame 402 of messages generated by nodes 102a-102n under the supervision of bus management tool 142 using methods and systems consistent with the present invention. Messages in the frame 402 are generated following the communication protocol of busses 106 and 108, such as the IEEE-1394b standard protocol. As shown in FIG. 4, the data processing system 100 is operatively configured to allow nodes 102a-102n to generate isochronous messages 404, 406 (e.g., for transfer of video or audio up to a predetermined bandwidth) and asynchronous messages 408, 410 within each frame 402. Nodes 102a-102n may be configured to provide a handshake acknowledge message (not shown in frame 402 of FIG. 4) in response to each of the asynchronous messages 408, 410 directed to and received by the respective node 102a-102n. In one implementation, nodes 102a-102n do not provide a handshake acknowledge message in response to an asynchronous message 408, 410 when the asynchronous message 408, 410 is transmitted using a broadcast channel number as discussed below.

Within data processing system 100, each node 102a-102n is assigned a respective one of a plurality of channel numbers so that each node 102a-102n may selectively direct a message in frame 402 to another node 102a-102n. In the implementation shown in FIG. 4, data processing system 100 has 4 nodes (e.g., nodes 102a-102n) that are each assigned a different channel number. Each message of frame 402 has a header (not shown in FIG. 4) including a destination channel number reflecting the destination of the respective message. For example, message 412 of frame 402 has a header that includes a destination channel number 414 that indicates message 412 is directed to channel number "1," assigned to node 102a. The header of each message of frame 402 may also include a source channel number reflecting the source of the respective message. Continuing with the example depicted in FIG. 4, message 412 of frame 402 has a source channel number 416 indicating that message 412 was transmitted by the node 102b-102n assigned to channel number "2" (e.g., node 102b).

Any channel number not assigned to nodes 102a-102n may be assigned as a broadcast channel to direct a message to each node in data processing system 100 other than the node transmitting the message. For example, in the implementation shown in FIG. 4, data processing system 100 is configured such that channel number 62 is assigned as a broadcast number and node 102a transmits message 418 with channel number 62 as the destination channel number, directing other nodes 102b-102n to respond to message 418.

As shown in FIG. 4, the data processing system 100 may be further configured so that each frame 402 has a duration of time t corresponding to a nominal refresh rate for all nodes 102a-102n to generate the messages in frame 402, such as 10 ms duration for a 100 Hz refresh rate. Frame 402 may be subdivided into a number of minor frames 420, 422 of a duration that is an integral multiple of the cycle period or length for the busses 106 and 108. For example, in one implementation in which the communication protocol of bus 106 and 108 corresponds to IEEE-1394 standard protocol, the cycle length is 125 microseconds. In this implementation, the frame 402 may have ten minor frames 420, 422 and each minor frame 420, 422 may have eight cycles (e.g., cycles 424, 426, and 428) having a cycle length of 125 microseconds such that each minor frame has a duration of 1 millisecond.

Each node 102a-102n may be assigned one or more minor frame numbers in which it is authorized to arbitrate for the bus 106 and 108 to transmit an asynchronous message 408 and 410. For example, in the implementation shown in FIG. 4, node 102a is assigned channel number "1" and assigned to arbitrate for the bus 106 and 108 in minor frames 420 and 422 to transmit message 418 and message 440, respectively. In addition, multiple nodes may be assigned to any minor frame 420, 422 or in any cycle 424, 426, and 428 in accordance with a predetermined amount of messages to be transmitted by the nodes 102a-102n on the bus 106 or 108.

The bus management tool 142 may be configured to authorize the allocation of bandwidth to any node 102a-102n requesting to transmit an isochronous message 404 or 406, to transmit a synchronization message (not shown in FIG. 4) at the beginning of each frame, and to transmit a cycle start message (not shown in FIG. 4) at the beginning of each minor frame.

Figure 5:
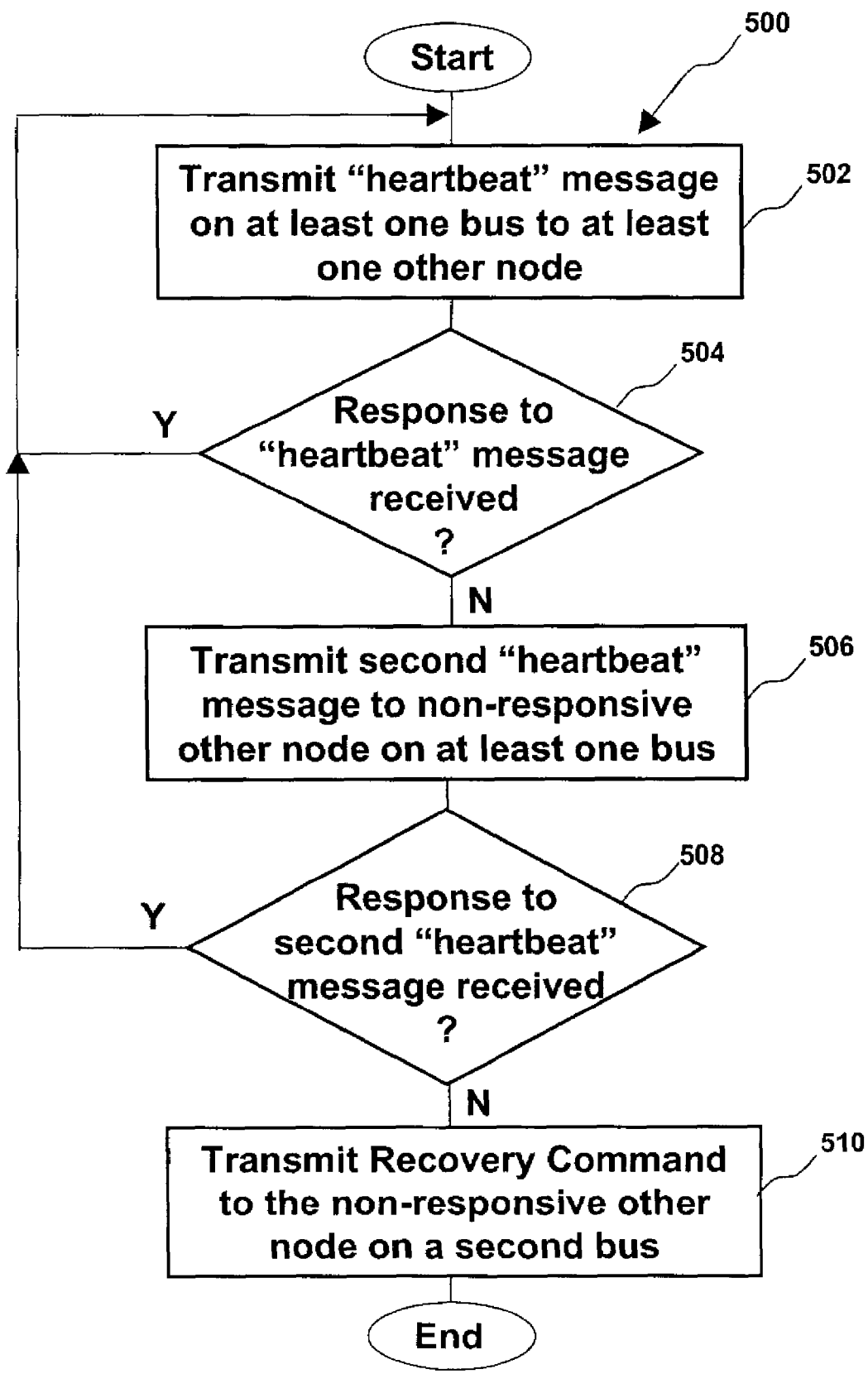
FIG. 5 depicts a flow diagram illustrating an exemplary process performed by the bus management tool in FIG. 1 to detect a bus interface circuit of a node that is experiencing a radiation induced latch-up or upset error on a bus and to recover communication on the bus to the node.

Turning to FIG. 5, a flow diagram is shown that illustrates a process performed by the bus management tool 142 of node 102a to detect a bus interface circuit of a node 102a-102n that is experiencing a latch-up or radiation-induced upset error on a bus 106 or 108 and to recover communication on the bus 106 or 108 to the respective node 102a-102n. Initially, the bus management tool 142 of node 102a transmits a "heartbeat" or first message on one or both of the busses 106 and 108 to at least one other node 102b-102n. (Step 502) The "heartbeat" message is at least one of the plurality of messages (e.g., isochronous messages 404, 406 and asynchronous messages 408, 410) transmitted by the nodes 102a-102n in frame 402. The bus management tool 142 may transmit the "heartbeat message" 418 once each frame 402 or once each minor frame 420 and 422 to one node or to all nodes (e.g., via a broadcast message). For example, the bus management tool 142 of node 102a may transmit the "heartbeat" message as broadcast message 418 of frame 402 so that each other node 102b-102n may be expected to respond to the "heartbeat" message on one or both busses 106 and 108 during its response period within the each frame. In the implementation shown in FIG. 4, nodes 102b-102n are assigned channel numbers "2" through "4" and are configured to respond to the "heartbeat" message 418 by transmitting a handshake acknowledge message or a respective reply message (e.g., messages 412, 442, and 444) in the minor frame 420, 422 assigned to each node 102b-102n.

Figure 6:
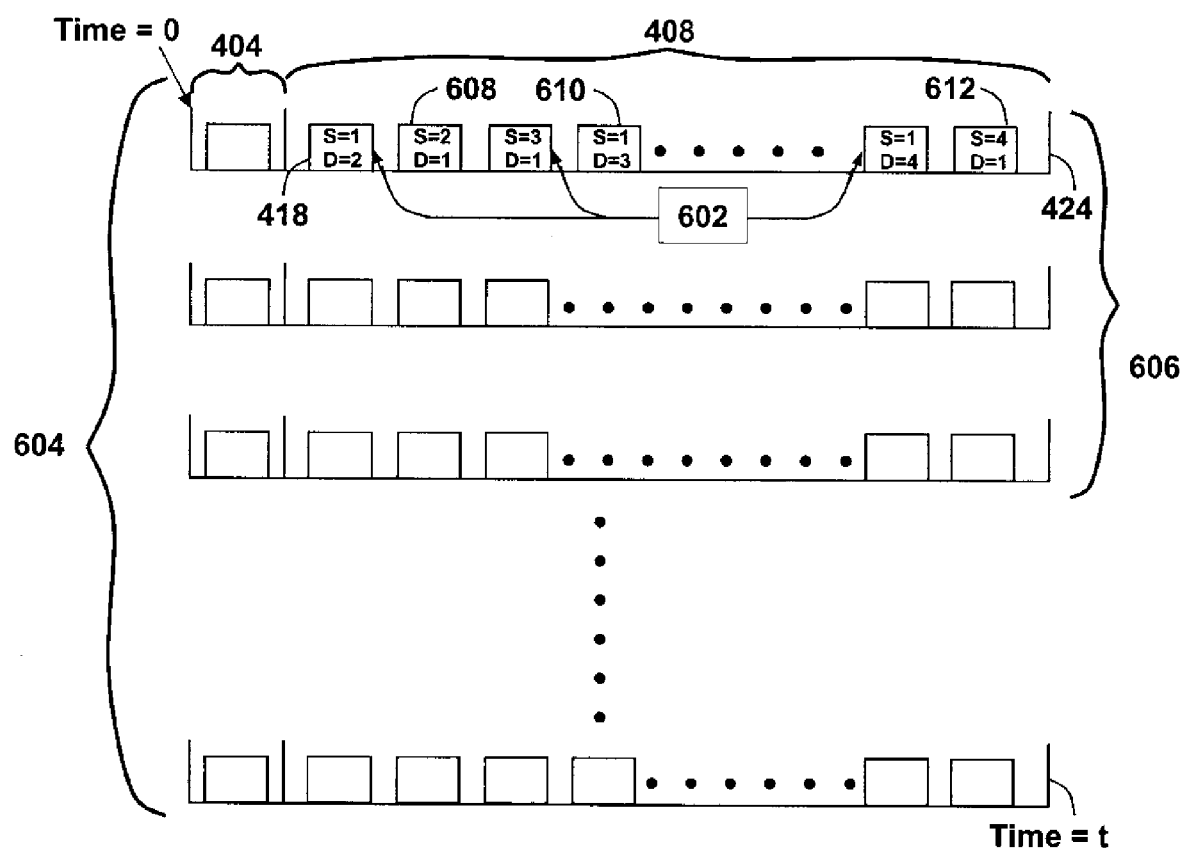
FIG. 6 depicts another exemplary timing diagram for a frame of messages generated by nodes in the data processing system of FIG. 1 in which the bus management tool selectively transmits a "heartbeat" message to nodes of the system.

Alternatively, the bus management tool 142 of node 102a may individually transmit the "heartbeat message" to other nodes 102b-102n in the data processing system 100. For example, in the implementation shown in FIG. 6, the bus management tool 142 is configured to transmit separate "heartbeat messages" (e.g., collectively referenced as 602) on bus 106 or 108 to nodes 102b-102n in the frame 604. Each of the nodes 102b-102n receiving the "heartbeat message" 602 may subsequently respond by transmitting a respective handshake acknowledge message (e.g., messages 608, 610, and 612) to the bus management tool 142 hosted on node 102a.

Returning to FIG. 5, after transmitting the "heartbeat" message, the bus management tool 142 determines whether the "heartbeat" message was received by the other of the nodes on the first bus (e.g., bus 106 or 108). (Step 504) If the "heartbeat" message has been transmitted on both busses 106 and 108, the bus management tool may determine whether the "heartbeat" message was received by the other of the nodes on each of the busses 106 and 108. As shown in FIG. 4, the bus management tool 142 may determine that the "heartbeat" message (e.g., 418) was not received by the other nodes 102b-102n if the other nodes 102b-102n fail to transmit the respective reply message (e.g., messages 412, 442, and 444) in the response period or minor frame assigned to each node 102b-102n. Alternatively, the bus management tool 142 may determine that the "heartbeat" message was not received, if the other nodes 102b-102n fail to respond to a respective "heartbeat message" (e.g., respective one of "heartbeat" messages 602 in FIG. 6) within a predetermined period. The bus management tool 142 may also determine that the "heartbeat" message was not received if the handshake acknowledge message or respective reply message (e.g., messages 412, 442, 444, 608, 610, and 612) identifies a communication error has occurred in association with the "heartbeat" message, such as a checksum error.

If the "heartbeat" message was received, the bus management tool 142 may continue processing at step 502. Thus, the bus management tool 142 is able to continually monitor for any node 102a-102n experiencing a latch-up or radiation induced upset condition on bus 106 or 108 by periodically transmitting a "heartbeat" message to each node 102b-102n on busses 106 and 108.

If the "heartbeat" message was not received, the bus management tool 142 may transmit a second "heartbeat" message to the non-responsive node on the first and/or second bus (e.g., bus 106 or 108). (Step 506) In one implementation, the bus management tool 142 waits until the next frame 402 to transmit the second "heartbeat" message. Alternatively, the bus management tool 142 may transmit the second "heartbeat" message when node 102a or the node hosting the bus management tool 142 is able to gain access to bus 106 or 108.

Next, the bus management tool 142 determines whether the second "heartbeat" message was received by the non-responsive nodes on the first bus (e.g., bus 106 or 108). (Step 508) The bus management tool 142 may determine that the second "heartbeat" message was received using the same techniques discussed above for the first "heartbeat" message.

Figure 7:
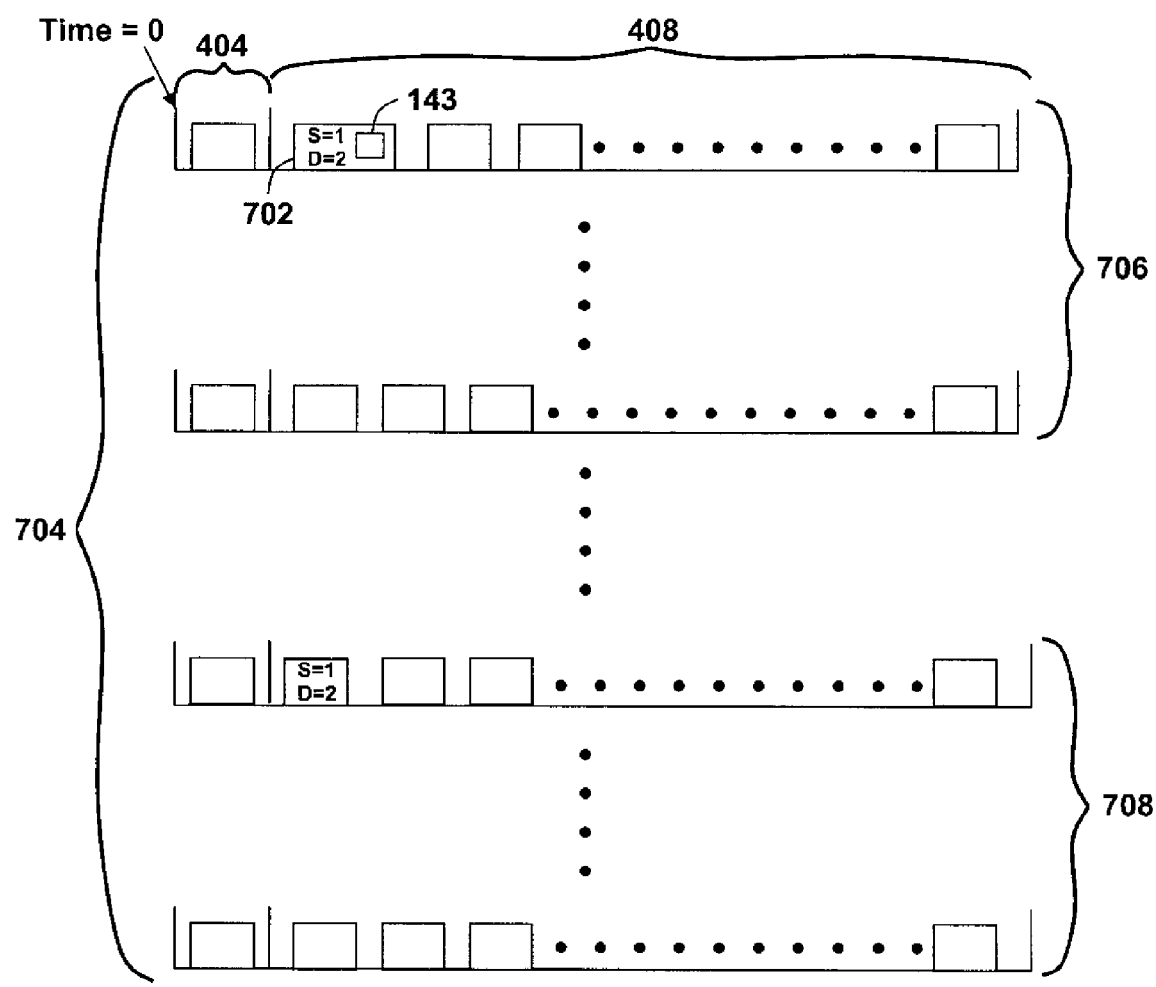
FIG. 7 depicts an exemplary timing diagram of a frame on a bus in which the bus management tool transmits a recovery command in a message to a node experiencing a radiation induced latch-up or upset error on another bus.

If the second "heartbeat" message was received, the bus management tool 142 may continue processing at step 502. If the second "heartbeat" message was not received, the bus management tool 142 transmits a recovery command to the non-responsive other node on a second of the plurality of busses. (Step 510) The bus management tool 142 may have previously performed the process 500 to verify that the other node is not experiencing a radiation induced error on the second bus. For example, assuming frame 402 in FIG. 4 is transmitted on primary bus 106 and node 102b (assigned to channel number "2" in this example) fails to transmit message 412 in response to "heartbeat" message 418 or transmits message 412 with an indication that a communication error occurred with "heartbeat" message 418, then the bus management tool 142 may transmit recovery command 143 in a message 702 in a frame 704 on the secondary or unaffected bus 108 as shown in FIG. 7. The message 702 may be transmitted by the bus management tool 142 when the node 102 is next granted access to the secondary or unaffected bus 108. As discussed in further detail below, the non-responsive other node (e.g., node 102b) is configured to re-initialize or cycle power to a bus interface circuit (e.g., PHY controller 110 and/or Link controller 114) operatively connecting the other node to the first bus (e.g., the bus 106 on which node 102b is experiencing a radiation induced error) in response to receiving the recovery command on the second bus (e.g., the bus 108 on which node 102b is not experiencing a radiation induced error).

After transmitting the recovery command to the non-responsive other node, the bus management tool 142 may then terminate processing. The bus management tool 142 may continue to perform the process depicted in FIG. 5 to verify communication is re-established with the non-responsive other node (e.g., node 102b) on the first bus (e.g., the primary bus 106) and to maintain communication on both busses 106 and 108 for all nodes 102a-102n.

Figure 8:
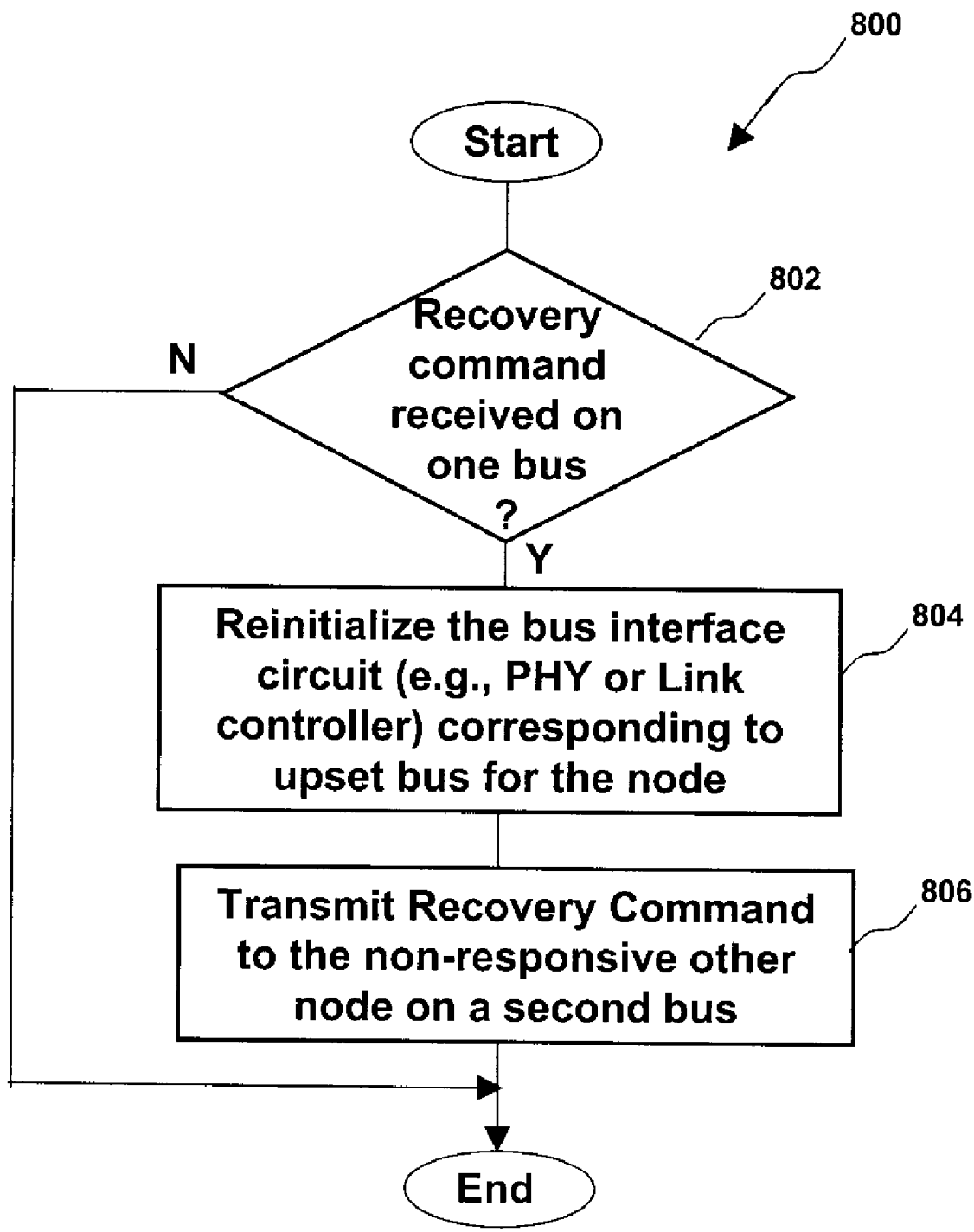
FIG. 8 depicts a flow diagram illustrating an exemplary process performed by the bus recovery tool in FIG. 1 to clear a radiation induced latch-up or upset error detected by the bus management tool in FIG. 1.

FIG. 8 depicts a flow diagram illustrating an exemplary process performed by the bus recovery tool 144 of a node (e.g., node 102b) to clear a bus interface circuit of the node that is experiencing a radiation induced latch-up or upset error on a bus 106 or 108 as detected by the bus management tool 142. Initially, the bus recovery tool 144 of the node determines whether a recovery command 143 has been received on one of the busses 106 or 108. (Step 802) If a recovery command 143 has not been received on one of the busses 106 or 108, the bus recovery tool 142 may end processing. Alternatively, in one implementation, the bus management tool 142 is configured to thread or perform processes in parallel, and thus may continue processing at step 802.

In the example shown in FIG. 7, the bus recovery tool 144 of node 102b may determine that the recovery command 143 was received in message 702 in frame 704 on the secondary bus 108 after the bus management tool 142 has performed the process in FIG. 5 to detect that PHY controller 110 of node 102b, Link controller 114 of node 102b, or both are experiencing a radiation induced latch-up or upset error on primary bus 106.

If a recovery command 143 has been received on one of the busses 106 or 108, the bus recovery tool 144 re-initializes or cycles power to the bus interface circuit (e.g., PHY controller or Link controller) corresponding to the second or other bus of the node experiencing a radiation induced error. (Step 804) Continuing with the example of FIG. 7, the bus recovery tool 144 of node 102b may re-initialize the PHY controller 110, the Link controller 114, or both that are operatively connected to the primary or affected bus 106 in response to receiving the recovery command 143 on the secondary or unaffected bus 108. To re-initialize the PHY controller 110 and the Link controller 114, the bus recovery tool 144 of node 102b may transmit one or more control messages 300 in FIG. 3 to the respective bus interface recovery circuit 126 or 128 of the node 102b so that power controllers 206 and 210 re-cycle power to the PHY controller 110 and the Link controller 144 as discussed above in reference to FIG. 2.

Next, the bus recovery tool 144 transmits a message on the second or unaffected one of the busses 106 or 108 indicating communication has been restored. (Step 806) In the implementation in FIG. 7, to indicate that communication has been restored for node 102b on the primary bus 106, the bus recovery tool 144 transmits the message 710 to the bus management tool 142 of node 102a in frame 704. Alternatively, the bus recovery tool 144 may transmit the message 412 on the primary bus 106 in the next frame 402 in response to receiving the "heartbeat" message 418 from the bus management tool 144 as discussed above. To ensure communication has been restored on the first or affected one of the busses 106 and 108, bus recovery tool 144 may read the current level via the respective current sensors 204 and 208 of the node 102b to determine whether the current level is below the predetermined level (e.g., 200 milliamps or more) corresponding to a radiation-induced glitch or short circuit. After transmitting the message 710 or 412 indicating communication has been restored, the bus recovery tool 144 may end processing as shown in FIG. 8.

Figure 9:
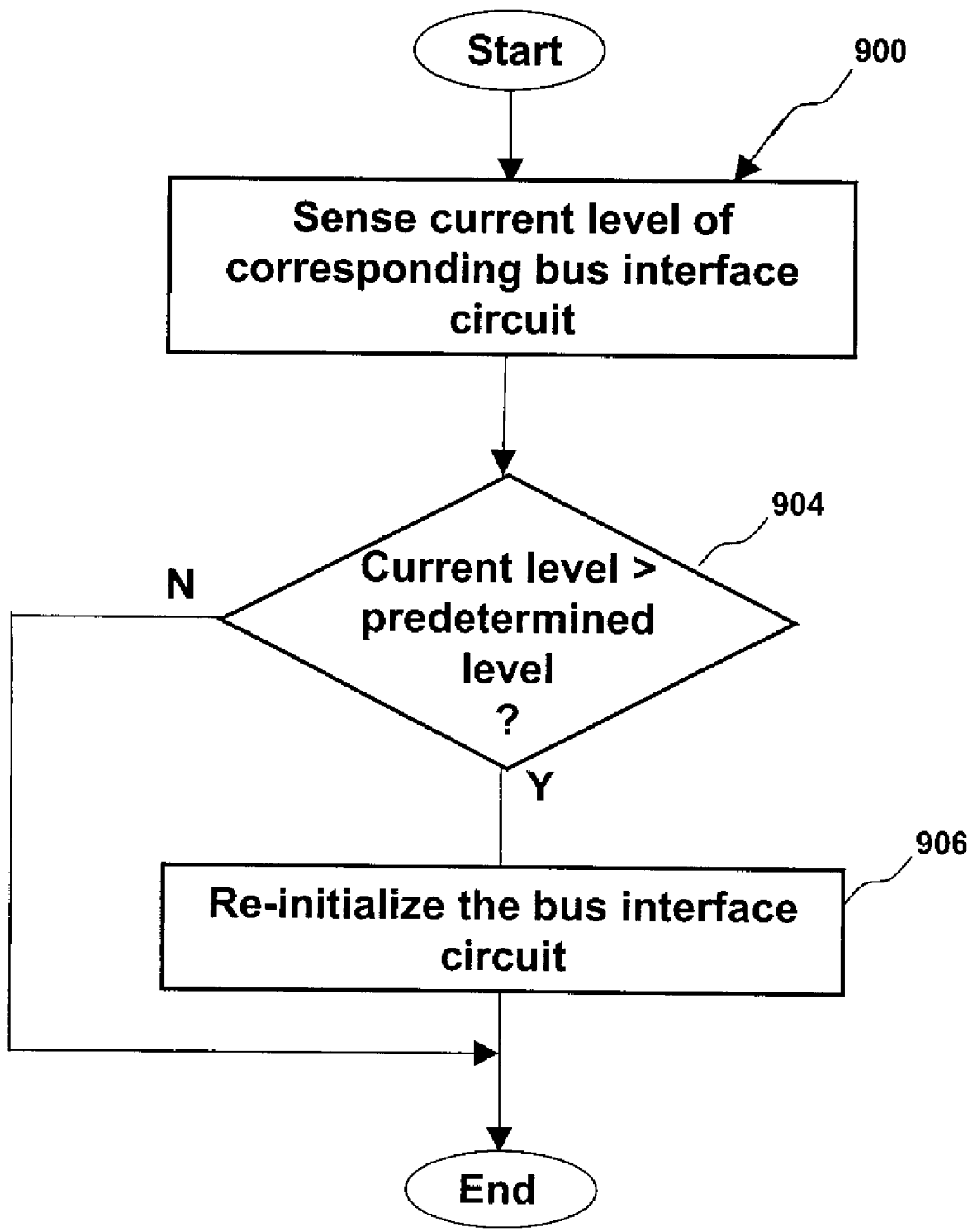
FIG. 9 depicts a flow diagram illustrating another exemplary process performed by the bus recovery tool of a node to detect a bus interface circuit of the node that is experiencing a radiation induced latch-up or upset error on a bus and to clear the detected latch-up or radiation induced upset condition.

FIG. 9 depicts a flow diagram illustrating a exemplary process 900 performed by the bus recovery tool 144 of each node 102a-102n to detect a bus interface circuit of the node that is experiencing a radiation induced latch-up or upset error on a bus 106 or 108 and to clear the detected latch-up or upset error. Thus, by performing process 900, each node 102a-102n may automatically recover from a latch-up or single event functional interrupt caused by a radiation induced glitch or current surge on a bus interface circuits 110, 112, 114, or 114 operatively connected to respective bus 106 or 108. Initially, the bus recovery tool 144 of a respective node 102a-102n senses a current level on a bus interface circuit (e.g., PHY controller 110 or 112, or Link controller 112 or 116). (Step 902) As discussed above, the bus recovery tool 144 may provide an enable signal 224 (e.g., Bit 6 of control message 300 in FIG. 3) to the bus interface recovery circuit 126 and 128 to selectively cause the bus interface recovery circuit to report the sensed current level of PHY controller 110, 112 or the sensed current level of Link controller 114, 116 when the output signal 234 of switch 232 is set to correspond to the channel designated by enable signal 224. The bus recovery tool 144 provides a second enable signal (e.g., Bit 7 of control message 300) to select receiving the sensed current level of the PHY controller 110, 112 or the Link controller 114, 116.

Next, the bus recovery tool 144 of the node 102a-102n determines whether the sensed current level on the bus as received by the corresponding bus interface circuit (e.g., PHY controller 110 or 112, or Link controller 114 or 116) exceeds a predetermined level, such as that corresponding to a radiation induced glitch or surge. (Step 904) If the sensed current level does not exceed a predetermined level, the bus recovery tool 144 ends processing. If the sensed current level on the bus corresponding to the bus interface circuit 110, 112, 114, or 116 exceeds the predetermined level, the bus recovery tool 144 of the node 102a-102n re-initializes or cycles power to the respective bus interface circuit 110, 112, 114, or 116. (Step 906) For example, assuming that the bus recovery tool 144 of node 102a determines that the sensed current level on the primary bus 106 corresponding to the PHY controller 110 in FIG. 1 exceeds the predetermined level corresponding to a radiation induced surge on the primary bus 106, the bus recovery tool 144 of node 102a may automatically re-initialize the PHY controller 110 of node 102a by toggling bit 2 in one or more control messages 300 to bus interface recovery circuit 126 of node 102a so that power is cycled to PHY controller 110. One skilled the art would appreciate that the bus recovery tool 144 may detect and clear a radiation induced latch-up or upset on PHY controller 112 and Link controllers 114 and 116 in a like manner via corresponding power enable signals (e.g., Bits 4, 1 and 3 of control message 300).

Figure 10:
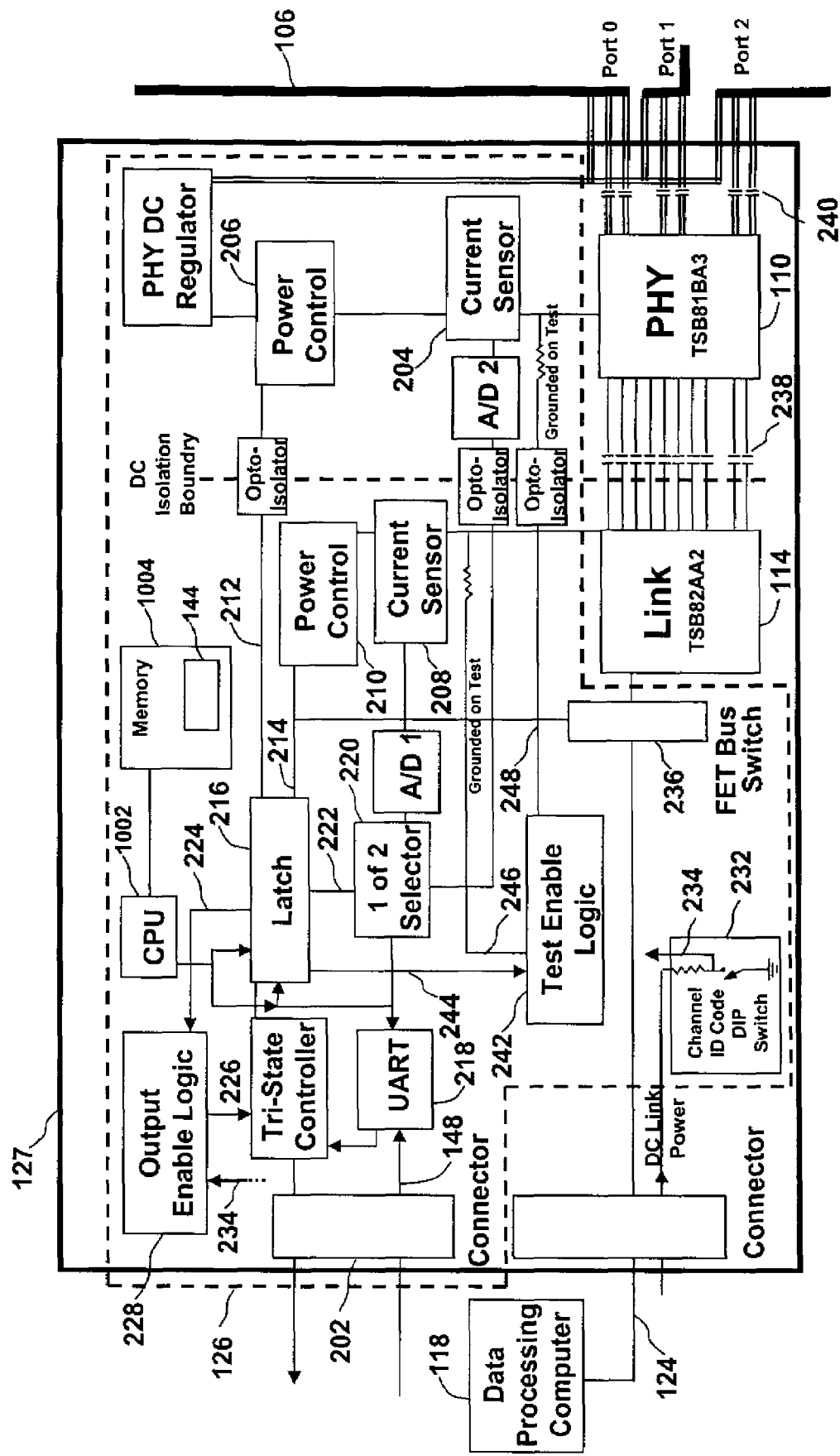
FIG. 10 depicts an exemplary block diagram of another bus interface recovery circuit suitable for use with methods and systems consistent with the present invention.

In one implementation, each bus interface recovery circuit 126 and 128 may have a dedicated bus recovery tool 144 suitable for use with methods and systems consistent with the present invention to allow automatic recovery from a radiation induced latch-up or upset condition detected by the dedicated bus recovery tool 144 on a bus 106 or 108. In this implementation, each bus interface recovery circuit 126 and 128 has a CPU 1002 and a memory 1004 containing the bus recovery tool 144 as shown in FIG. 10. The CPU 1002 is operatively connected to memory 1004, latch 216, and multiplexer 220 so that bus recovery tool 144 residing in memory 1004 may perform process 900 as described above to automatically detect and clear a radiation induced latch-up or upset condition associated with bus interface circuit 110, 112, 114, or 116. In this implementation, the bus recovery tool 144 may send a control message 300 directly to latch 216 and monitor a sensed current level directly from multiplexer 220. As shown in FIG. 10, the CPU 1002 may also be operatively connected to the backplane or second network 124 so that the bus recovery tool 144 may perform process 800 and respond to a recovery command 143 from the bus management tool 142 on the bus 106 or 108.

Figure 11:
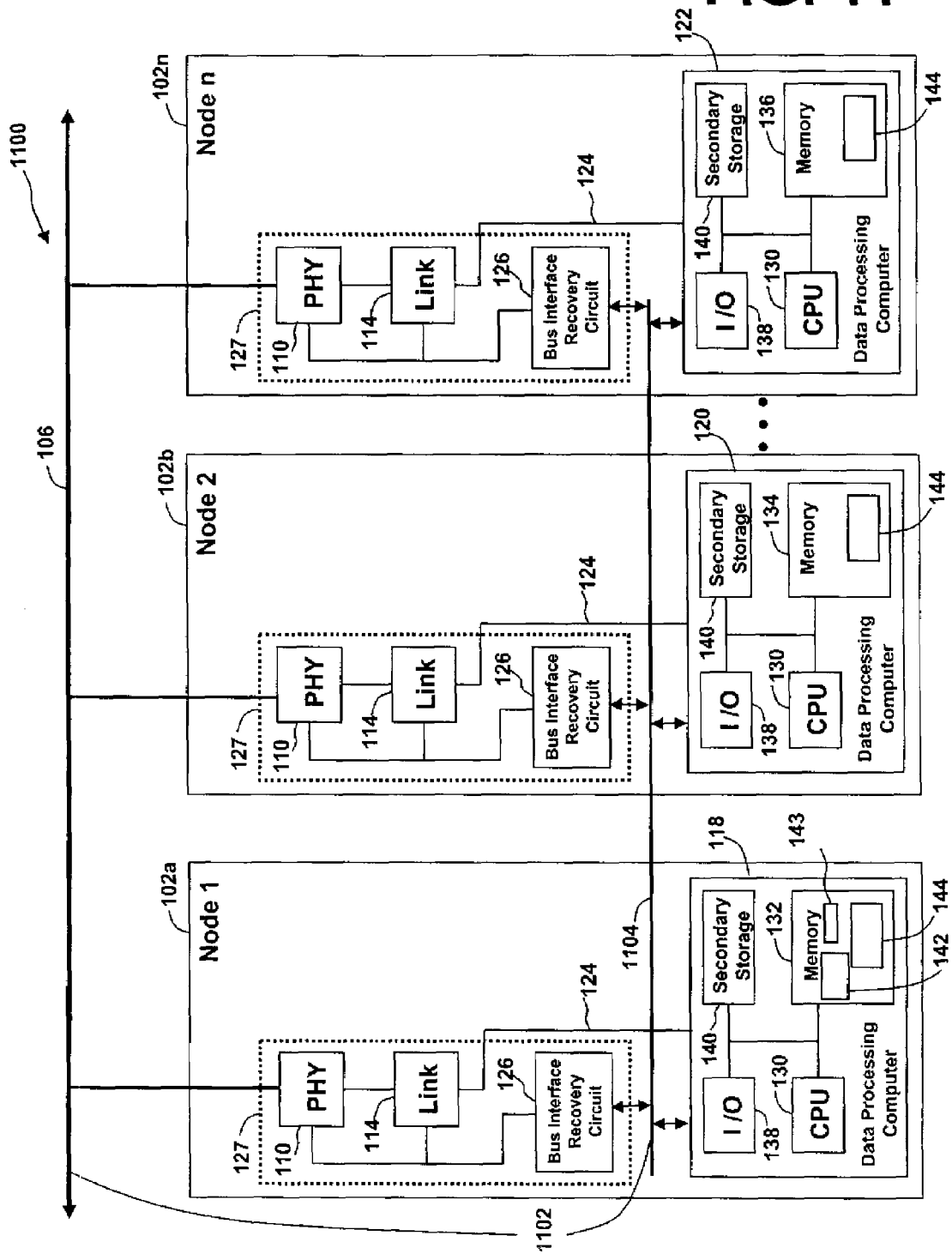
FIG. 11 depicts a block diagram of another vehicle data processing system having a bus management tool and a bus recovery tool suitable for practicing methods and implementing systems consistent with the present invention.

FIG. 11 depicts a block diagram of another vehicle data processing system 1100 suitable for practicing methods and implementing systems consistent with the present invention. The data processing system 1100 also includes a plurality of nodes 102a-102n operatively connected to a network 1102 having a primary bus 106 and a secondary bus 1104. In this implementation, the secondary bus 1104 is a different type of bus than the primary bus 106. For example, the primary bus 106 may be configured to implement a first communication protocol such as a IEEE-1394b cable based network protocol and the secondary bus 1104 may be a multi-drop bus, such as an Inter-IC or I.sup.2C bus. In this implementation, the secondary bus 1104 connects the bus management tool 142 in node 102a to a bus interface recovery circuit 126 in each of the nodes 102a-102n of the data processing system 1100, such that the bus management tool 142 and the bus interface recovery tool 144 of node 102a may control the respective bus interface recovery circuit 126 of each node 102a-102n in accordance with methods consistent with the present invention.

As shown in FIG. 11, each node 102a-102n has at least one bus interface circuit (e.g., a PHY controller 110 and/or a Link controller 114) to operatively connect a data processing computer 118, 120, and 122 of the respective node 102a-102n to the primary bus 106. Each data processing computer 118, 120, and 122 is operatively connected to the bus interface circuit via a second network 124 as described above for data processing system 100. In one implementation, the PHY controller 110, the Link controller 114, and the bus interface recovery circuit 126 or 128 may be incorporated into a single network interface card 127.

In this implementation, when performing the process depicted in FIG. 5, the bus management tool 142 may detect a bus interface circuit (e.g., circuit 110 or 114) of a node that is experiencing a radiation induced latch-up or upset error on the primary bus 106 and send a recovery command to recover communication on the primary bus 106 to the unresponsive node on the secondary bus 1104 so that the bus recovery tool 144 may perform the process depicted in FIG. 8 to recover communication on the primary bus 106 for the unresponsive node.

Since the secondary bus 1104 connects the bus management tool 142 to the bus interface recovery circuit 126 of each node 102a-102n, the bus management tool 142 may, in lieu of or in response to sending a recovery command on the secondary bus, cause the bus recovery tool 144 of node 102a to re-initialize or cycle power to the bus interface circuit (e.g., PHY controller or Link controller) of the node experiencing a radiation induced error. To re-initialize the PHY controller 110 and the Link controller 114, the bus recovery tool 144 of node 102a may transmit one or more control messages 300 in FIG. 3 via bus 1104 to the respective bus interface recovery circuit 126 of the unresponsive node 102a-n so that power controllers 206 and 210 re-cycle power to the PHY controller 110 and the Link controller 114 as discussed above in reference to FIG. 2. In one implementation, the recovery command may comprise the one or more control messages 300 for effecting the re-initialization of the bus interface circuit of the unresponsive node 102a-n.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. Additionally, the described implementation includes software, such as the bus management tool, but the present invention may be implemented as a combination of hardware and software or in hardware alone. Note also that the implementation may vary between systems. The invention may be implemented with both object-oriented and non-object-oriented programming systems. The claims and their equivalents define the scope of the invention.

What is claimed is:

1. A network interface apparatus, comprising:
a bus interface circuit for operatively connecting a network interface card to a data line of a bus wherein the bus interface circuit is a physical layer controller;
a first power controller operatively connected to the bus interface circuit;
a first current sensor operatively connected to the bus interface circuit to sense a first current level in a portion of the bus interface circuit connected to the data line of the bus; and
a recovery tool to determine whether the sensed first current level exceeds a predetermined level and to cause the first power controller to cycle power to the bus interface circuit in response to determining that the sensed first current level exceeds the predetermined level;
a link layer controller operatively connected to the data line on the bus via a physical layer controller;
a second power controller operatively connected to the link layer controller; and
a second current sensor operatively connected to the link layer controller to sense a second current level in the link layer controller,
wherein the recovery tool further determines whether the sensed second current level exceeds the predetermined level and causes the first power controller to cycle power to the physical layer controller and the second power controller to cycle power to the link layer controller in response to determining that one of the sensed first current level or the sensed second current level exceeds the predetermined level.

2. The network interface apparatus of claim 1, further comprising a switch operatively configured to selectively cause one of the first and second current sensors to report the respective sensed current level to the recovery tool to determine whether the sensed current level exceeds the predetermined level and for causing the power controller to cycle power to the bus interface circuit in response to determining that the sensed current level exceeds the predetermined level.

3. The network interface apparatus of claim 2, further comprising a terminal operatively connected between another bus and the switch; and a latch operatively configured to receive an enable signal via the terminal and to provide the enable signal to the switch to allow one of the first and second current sensors to continuously report the respective sensed current level on the other bus.

4. The network interface apparatus of claim 1, further comprising a bus switch operatively connected to the first power controller and the bus upstream from the bus interface circuit, the bus switch being operatively configured to isolate the bus interface circuit when the first power controller cycles power to the bus interface circuit.

5. The network interface apparatus of claim 4, wherein the physical layer controller is operatively connected between the link layer controller and the bus, wherein the link layer controller inhibits a current from the physical layer controller from reaching the link layer controller.

6. The network interface apparatus of claim 4, wherein the link layer controller is operatively connected to the bus upstream from the bus interface circuit, wherein the physical layer controller inhibits a current from the link layer controller from reaching the physical layer controller.

7. A method in a data processing system including a network having a bus, the method comprising:
sensing a current level in a portion of a bus interface circuit operatively connecting a node on the network to a data line on the bus;
determining whether the sensed current level exceeds a predetermined level;
re-initializing the bus interface circuit in response to determining that sensed current level exceeds the predetermined level, wherein the bus interface circuit is one of a plurality of bus interface circuits of the node operatively connecting the node to the bus and sensing a current level comprises selecting to receive the sensed current level associated with one of the bus interface circuits.

8. A method of claim 7 wherein re-initializing the bus interface circuit comprises isolating the bus interface circuit from a component operatively connected to the bus upstream from the bus interface circuit.

9. A method of claim 7 wherein re-initializing the bus interface circuit comprises cycling power to the bus interface circuit.

10. A method of claim 7 wherein the one of the bus interface circuits is a physical layer controller.

11. A method of claim 10 wherein re-initializing the bus interface circuit comprises inhibiting a current from reaching the physical layer controller.

12. A method of claim 11 wherein another of the bus interface circuits is a link layer controller and re-initializing the bus interface circuit comprises inhibiting a current from the link layer controller from reaching the physical layer controller.

13. A computer-readable medium containing instructions causing a program in a data processing system to perform a method, the data processing system including a network having a bus, the method comprising:
   sensing a current level in a portion of a bus interface circuit operatively connecting a node on the network to a data line on the bus;
   determining whether the sensed current level exceeds a predetermined level; and
   re-initializing the bus interface circuit in response to determining that sensed current level exceeds the predetermined level, wherein the bus interface circuit is one of a plurality of bus interface circuits of the node operatively connecting the node to the bus and sensing a current level comprises selecting to receive the sensed current level associated with one of the bus interface circuits.

14. A computer-readable medium of claim 13 wherein re-initializing the bus interface circuit comprises isolating the bus interface circuit from a component operatively connected to the bus upstream from the bus interface circuit.

15. A computer-readable medium of claim 13 wherein re-initializing the bus interface circuit comprises cycling power to the bus interface circuit.

16. A computer-readable medium of claim 13 wherein the one of the bus interface circuits is a physical layer controller.

17. A computer-readable medium 16 wherein re-initializing the bus interface circuit comprises inhibiting a current from the bus from reaching the physical layer controller.

18. A network interface apparatus, comprising:
   a bus interface circuit to connect a network interface card to a data line of a bus;
   a first power controller operatively connected to the bus interface circuit;
   a first current sensor operatively connected to the bus interface circuit to sense a first current level in a portion of the bus interface circuit connected to the data line of the bus; and
   a recovery tool to determine whether the sensed first current level exceeds a predetermined level and to cause the first power controller to cycle power to the bus interface circuit in response to determining that the sensed first current level exceeds the predetermined level; and
   a bus switch operatively connected to the first power controller and the bus upstream from the bus interface circuit, wherein the bus switch isolates the bus interface circuit when the first power controller cycles power to the bus interface circuit.

19. The network interface apparatus of claim 18, wherein the bus interface circuit is a physical layer controller and the network interface apparatus further comprises:
   a link layer controller operatively connected to the data line on the bus via the physical layer controller;
   a second power controller operatively connected to the link layer controller; and
   a second current sensor operatively connected to the link layer controller to sense a second current level in the link layer controller,
   wherein the recovery tool further determines whether the sensed second current level exceeds the predetermined level and causes the first power controller to cycle power to the physical layer controller and the second power controller to cycle power to the link layer controller in response to determining that one of the sensed first current level or the sensed second current level exceeds the predetermined level.

20. The network interface apparatus of claim 19, further comprising a switch operatively configured to selectively allow one of the first and second current sensors to report the respective sensed current level to the recovery tool to determine whether the sensed current level exceeds the predetermined level and for causing the power controller to cycle power to the bus interface circuit in response to determining that the sensed current level exceeds the predetermined level.

21. The network interface apparatus of claim 20, further comprising a terminal operatively connected between another bus and the switch; and a latch operatively configured to receive an enable signal via the terminal and to provide the enable signal to the switch to cause one of the first and second current sensors to continuously report the respective sensed current level on the other bus.

22. The network interface apparatus of claim 21, wherein the physical layer controller is operatively connected between the link layer controller and the bus, wherein the link layer controller inhibits a current from the physical layer controller from reaching the link layer controller.

23. The network interface apparatus of claim 22, wherein the link layer controller is operatively connected to the bus upstream from the bus interface circuit, wherein the physical layer controller inhibits a current from the link layer controller from reaching the physical layer controller.

* * * * *